United States Patent [19]

Stumpe et al.

[11] Patent Number: 5,738,418
[45] Date of Patent: Apr. 14, 1998

[54] PROCESS AND APPARATUS FOR CONTROLLING THE BRAKE SYSTEM OF A VEHICLE

[75] Inventors: Werner Stumpe, Stuttgart; Bernhard Schwendemann, Schorndorf; Matthias Horn, Hardheim, all of Germany

[73] Assignee: Robert Bosch GmbH, Stuttgart, Germany

[21] Appl. No.: 607,877

[22] Filed: Feb. 29, 1996

[30] Foreign Application Priority Data

Jun. 16, 1995 [DE] Germany ................ 195 21 872.8

[51] Int. Cl.[6] .................................................. B60T 7/00
[52] U.S. Cl. .................................................. 303/15
[58] Field of Search .................. 303/9.61, 7, 15; 364/426.01–426.04, 426.015, 426.016, 426.017, 426.018, 426.019, 426.021, 426.022, 426.023, 426.024, 426.025, 426.026, 426.027, 426.028, 426.036, 426.037, 426.038

[56] References Cited

U.S. PATENT DOCUMENTS

| 3,718,374 | 2/1973 | Ochia ................ 303/166 |
|---|---|---|
| 3,889,128 | 6/1975 | Luhdorff .............. 303/9 |
| 4,414,630 | 11/1983 | Harris ................ 303/95 |
| 4,653,815 | 3/1987 | Agarwal .............. 303/100 |
| 5,002,343 | 3/1991 | Bearley ............... 303/7 |
| 5,286,098 | 2/1994 | Okubo ................. 303/100 |

FOREIGN PATENT DOCUMENTS 4112845  10/1992  Germany .

Primary Examiner—Robert J. Oberleitner
Assistant Examiner—C. T. Bartz
Attorney, Agent, or Firm—Felfe & Lynch

[57] ABSTRACT

The onset and the end of the braking action, especially the braking action of the component vehicles of a combination vehicle, are determined on the basis of the course of the deceleration of the vehicle. On the basis of the values found for the onset and end of the braking action, the hysteresis between the component vehicles is compensated, so that the braking action begins and ends at essentially the same time at all the wheel brakes.

10 Claims, 4 Drawing Sheets

PROCESS AND APPARATUS FOR CONTROLLING THE BRAKE SYSTEM OF A VEHICLE

BACKGROUND OF THE INVENTION

The invention pertains to a process and to apparatus for controlling the brake system of a vehicle, especially a combination vehicle, wherein the brake tensioning force exerted on the wheel brakes is influenced by an electronic control unit.

A process and device of the type in question are known from DE 41 12 845 A1. In the compressed air brake system described there, the application pressure i.e., the pressure required to initiate braking action of the individual wheel brakes, is determined by evaluation of the change in pressure over time during the actuation of the brake. The application pressure thus determined is used to correct the nominal pressure derived from the driver's command for the individual wheel brakes for the purpose of producing a braking force which is the same at all of the individual wheels of the vehicle or at the wheels of one axle. A corresponding method can also be used to determine the separation pressure when the brakes are released. It has been found that, when each of the wheel brakes has a different hysteresis i.e., differences between the applications and releases, the braking forces at the time of contact and release at the individual wheel brakes or at the brakes of the individual component vehicles of a combination vehicle can be quite far apart. This leads to different braking durations at the individual wheel brakes or within the individual component vehicles, which lead to nonuniform wear on the wheel brakes and to a reduction in driving comfort. This effect is especially clear in the case of vehicle combinations with different types of brake systems, such as, for example, when one of the component vehicles has a conventional pneumatic brake system while the other component vehicle has an electrically controlled brake system.

SUMMARY OF THE INVENTION

It is the task of the invention to provide measures for compensating for this hysteresis of the brake system of a vehicle or vehicle combination. This is achieved by determining the onset and the end of braking action by evaluating the deceleration of the vehicle. Brake tensioning forces are adjusted so that the onset of the braking action and the end of braking action occurs at essentially the same time at all the wheel brakes.

The process according to the invention makes it possible to compensate for cases in which the various vehicle brakes have different hystereses in response to the application and release forces. As a result, the driving comfort and the wear properties are improved.

The process offers special advantages in the case of combination vehicles, because in that case essentially the same application and release forces of the component vehicles are arrived at automatically. As a result, in addition to an improvement in the driving comfort and in the wear properties of the vehicle combination, the forces acting between the component vehicles during the braking process are also reduced.

Particular advantages are derived when at least one component vehicle has an electrically controlled brake system. In this case, no additional sensors are required. The trailer control module of a tractor vehicle serves both as an aid in determining the application and release forces and also as an actuator/final control element/servo element for the brake system of the trailer.

It is especially advantageous that the process is able both to recognize the application and release points and also to compensate for different hystereses in the vehicle brake system.

DESCRIPTION OF THE EXEMPLARY EMBODIMENTS

Figure 1:
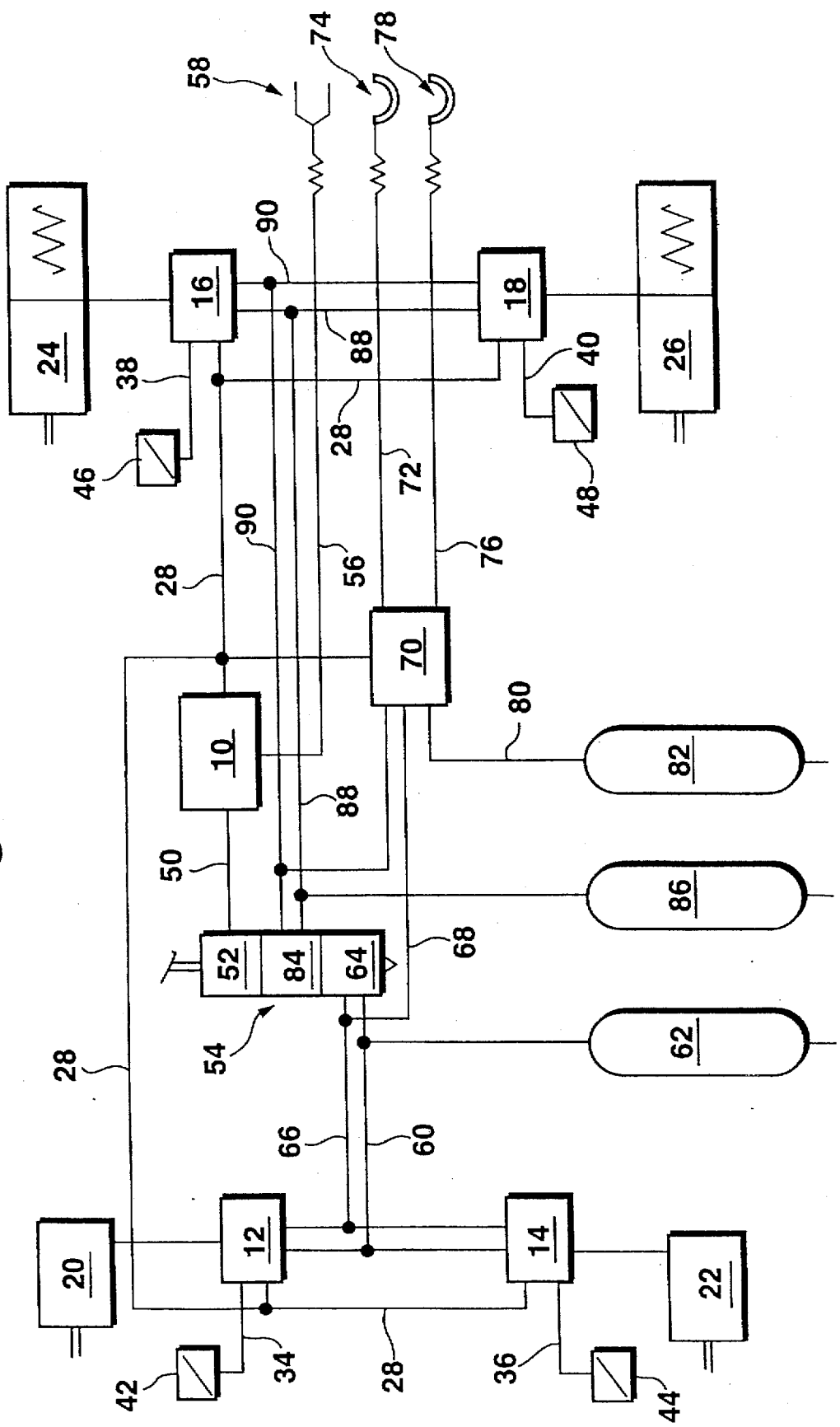
FIG. 1 shows an electronically controlled brake system of a tractor vehicle.

FIG. 1 shows a general block circuit diagram of an electronically controlled brake system based on the example of an electronically controlled compressed air brake system with emergency brake circuit for a two-axle tractor vehicle with a trailer coupling.

FIG. 1 shows a central control unit 10, which includes at least one microcomputer. In addition, so-called pressure control modules 12, 14, 16, 18 are provided at decentralized locations, each being assigned to a wheel brake 20, 22, 24, 26 of the tractor vehicle. Central control unit 10 is connected by way of a communications system 28, e.g., CAN, to pressure control modules 12–18. To detect the brake pressure supplied and to detect additional variables such as axle loads, wheel rpm's, brake temperatures, etc., lines 34, 36, 38, 40 leading from corresponding measuring instruments 42, 44, 46, 48 are connected to pressure control modules 12–18 as well. Central control unit 10 is also connected by a line 50 to electrical section 52 of a brake value sensor 54. In addition, a trailer control module 70 is provided to control the brake system of the trailer; this module is connected via communications system 28 to central control unit 10. In addition, a line 56 leads from central control unit 10 to an electrical plug connection 58 leading to the trailer.

In the system shown in FIG. 1, the pneumatic section of the brake system consists of two brake circuits, one for the front axle and one for the rear axle. Pressure control modules 12, 14 assigned to wheel brakes 20, 22 of the front axle are supplied via lines 60 with feed pressure originating from a supply tank 62. Control lines 66 extend from pneumatic section 64 of the brake value sensor to pressure control modules 12, 14. In addition, a line 68 leads from line 66 to trailer control module 70 for controlling the brake system of the trailer. From trailer control module 70, a pneumatic control line 72 leads to a first coupling head 74; a feed line 76 leads to a second coupling 78. In addition, trailer control module 70 is also connected by a line 80 to a pressure supply tank 82. The second brake circuit consists of second pneumatic section 84 of brake value sensor 54, pressure supply tank 86, air feed line system 88, and pneumatic control line system 90. Feed lines 88 and control lines 90 lead from brake value sensor 54 to pressure control modules 16, 18 assigned to wheel brakes 24, 26 of the rear axle.

In a preferred exemplary embodiment, a measure for the degree of actuation of the brake pedal is sent to central control unit 10 by electrical section 52 of brake value sensor 54. This signal is processed in the central control unit, and nominal pressure, nominal braking moment, nominal force, or nominal slip values for the individual wheel brakes or for the trailer are determined in accordance with predetermined characteristic curves or characteristic fields, possibly under consideration of additional operating parameters such as axle loads, wheel-specific variables, vehicle deceleration, etc. These nominal values are transmitted via communications system 28 to the individual pressure control modules and to the trailer control module, which adjust the pressure being supplied to the individual wheel brakes or to the brake system of the trailer so that it matches the specified nominal value. In the event of a defect in the electrical section of the brake system, this section or at least the defective part (e.g., the front or rear axle) is turned off, and the pneumatic emergency brake circuit or circuits are put into service. When the emergency brakes are operating, the driver specifies the wheel brake pressure in the individual wheel brakes by means of pneumatic sections 64, 84 of brake value sensor 54 via control lines 66, 90, respectively, and this pressure is supplied to the wheel brakes by the pressure control modules in the absence of electric actuation.

The process according to the invention can be used advantageously not only in conjunction with the brake system shown in FIG. 1 but also in brakes of systems of other designs such as electro-pneumatic systems, electro-hydraulic systems, and brake systems with purely electrical closing of the brakes. In addition to the combination, shown in FIG. 1, of an electrically controlled tractor vehicle with a conventionally braked trailer, a vehicle combination consisting of a conventionally braked tractor and a conventionally braked trailer, a conventionally braked tractor and an electrically braked trailer, and an electrically braked tractor and an electrically braked trailer can also be provided. For the brake system of the conventionally braked trailer, a trailer control module is to be provided, which can be actuated electrically either by the central control unit, or, if the tractor also has conventional brakes, by the ABS/ABR control unit, for example. This trailer control module makes it possible for the braking pressure or the braking force in the trailer brake system to be controlled from a remote location, i.e., from the tractor.

The individual wheel brakes usually make contact at different times; in particular, the wheel brakes of the tractor usually make contact at a different time than those of the trailer. This means that, when a braking process begins, the braking actions at the individual wheel brakes occur at different times. A similar type of behavior can be observed upon completion of the braking process and the brakes are released. The braking behavior is especially unsatisfactory when the hysteresis between the force required to initiate the braking action (braking pressure) and the force expended when the brakes are released (braking pressure) is different between the individual wheel brakes or the component vehicles.

The process according to the invention provides solutions by means of which it is possible to compensate for this hysteresis and to arrive at essentially the same application and release forces at the wheel brakes. The basic idea of the process according to the invention is that the application and release forces of the individual wheel brakes or of the component vehicles are determined from the change over time in the deceleration of the vehicle and the assignment of the forces produced. The hysteresis compensation is then accomplished through appropriate correction of the nominal values for the individual wheel brakes or component vehicles on the basis of the difference between the application forces and between the release forces.

Figure 2A:
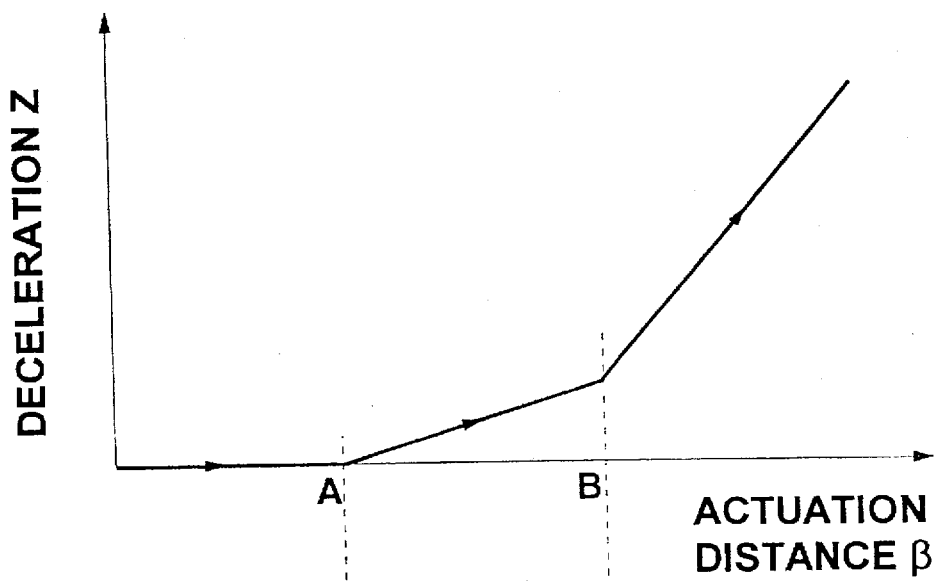
FIG. 2a shows the deceleration of the vehicle versus pedal actuation distance during pressure build-up.
Figure 2B:
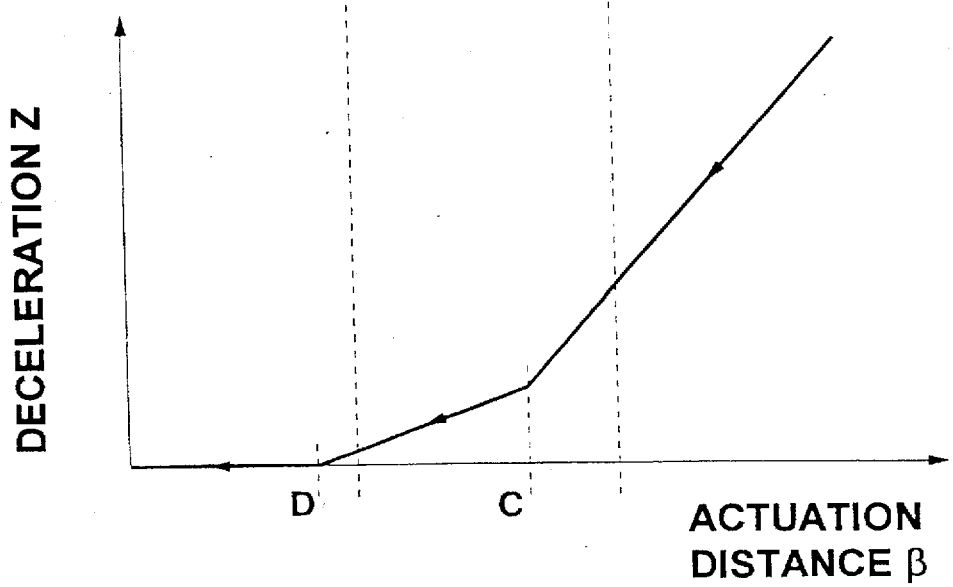
FIG. 2b shows the deceleration of the vehicle versus pedal actuation distance during pressure decrease.

The behavior of the vehicle or vehicle combination on which the determination of the application and release forces is based is described on the basis of the diagrams shown in FIGS. 2a and 2b, which illustrate a pneumatic brake system by way of example. The deceleration Z of the vehicle or of the vehicle combination is plotted versus the actuation distance β of the brake pedal for the pressure buildup phase (FIG. 2a) and also for the pressure reduction phase on release of the brake (FIG. 2b). Upon actuation of the brake pedal by the driver, a brake tensioning force is built up at the individual wheel brakes. Let us say that, after the brake pedal has been actuated in such a way as to travel a distance A, a first wheel brake or the brake system of the first component vehicle of a vehicle combination exercises its braking function. This leads to the deceleration of the vehicle. The curve of the deceleration shows an inflection near this point A. This inflection is determined by comparison of the deceleration values before and after the contact point associated with actuation distance A. The brake tensioning force (braking pressure) exerted on the wheel brake is then used as a basis for storing the application pressure of the first wheel brake of the first component vehicle. Let us say that now an additional wheel brake or the brakes of the second component vehicle make contact at actuation distance B, after—in terms of both time and distance—contact has been made at point A. Here, too, the deceleration curve shows an inflection, which is recognized in the same way as described above. And again, after the inflection in the deceleration curve is recognized, the application force of the second wheel brake or of the second component vehicle is derived from the brake tensioning force (braking pressure) just applied.

A similar curve for the deceleration versus the actuation distance is obtained upon release of the brake (FIG. 2b). Let us say the second wheel brake or the brakes of the second component vehicle release at an actuation distance of C, whereas the first wheel brake or the brakes of the first component vehicle release at an actuation distance of D. Evaluable inflections in the deceleration curve can be identified at both C and at D; and, after the inflection points have been determined, the release forces for the wheel brake or component vehicle in question can be derived from the corresponding brake tensioning forces (braking forces).

To compensate for the hysteresis between the application forces and between the release forces of the brakes (A to B or D to C), the differences are found between the determined application forces and between the release forces of the brakes (difference A–B, D–C). The corresponding values are then used as offset values for controlling the second wheel brake or second component vehicle, the first offset value being intended for the pressure buildup phase, the second offset value for the pressure reduction phase. This offset value corrects the course of the nominal brake tensioning force for the associated wheel brake or component vehicle with respect to the actuation distance of the brake pedal in such a way that the wheel brakes in question make contact at the same time and separate at the same time. When the process according to the invention is applied to the brake systems of component vehicles, the correction value represents a correction of the nominal value for the associated brake system. From this nominal value, the wheel-specific nominal values are then formed, possibly by means of wheel-specific corrections (also in relation to the application and release forces).

In certain concrete cases, the following difficulties can occur in connection with the use of the process according to the invention. If the application forces differ only slightly and the release forces differ only slightly, it is more difficult for the system to recognize the inflection points on the deceleration curves. It is therefore advantageous to use, for example, the trailer control module or the control module of the second wheel brake to influence the curve of the brake tensioning force being sent to the trailer or to this wheel brake in such a way as to make it easier to recognize the inflection points. It is advantageous in this case to stagger the buildup or reduction of the force in the component vehicles or wheel brakes. As a result, the time interval between the application of the wheel brakes or the release of the wheel brakes becomes artificially increased, which means that the system can more easily recognize and assign the inflection points to the wheel brakes or component vehicles.

It has also been found in a concrete example that, in cases where the hystereses are widely different, the order in which the values are detected can be turned around in extreme cases. Two contact values are determined during the pressure buildup phase, and two release values are found during the pressure reduction phase. If the hystereses are different enough, the sequence of these values during the buildup and reduction phases can be turned around and thus lead to an incorrect assignment of the values to the individual wheel brakes or component vehicles.

To avoid this, it is advantageous for a wheel brake or the brake system of the tractor to be measured separately from the other wheel brake or other component vehicle. The separate measurement of the application and release forces of the brake system of the tractor or of the first wheel brake is done on a roller test stand or during a special braking process, where the application and release values thus found are stored as vehicle constants. When the component vehicle is being operated without a trailer, furthermore, the application and release values can be determined by a method other than that based on deceleration. Then, during the operation of both vehicles together, the application and release values of the tractor determined in this way are used to assign the values determined by the process described above to the correct component vehicle or to the correct wheel brake. The hysteresis is then compensated on the basis of the current values determined as described above, which it has been possible to assign correctly to the individual component vehicles or wheel brakes on the basis of the stored values.

Figure 3:
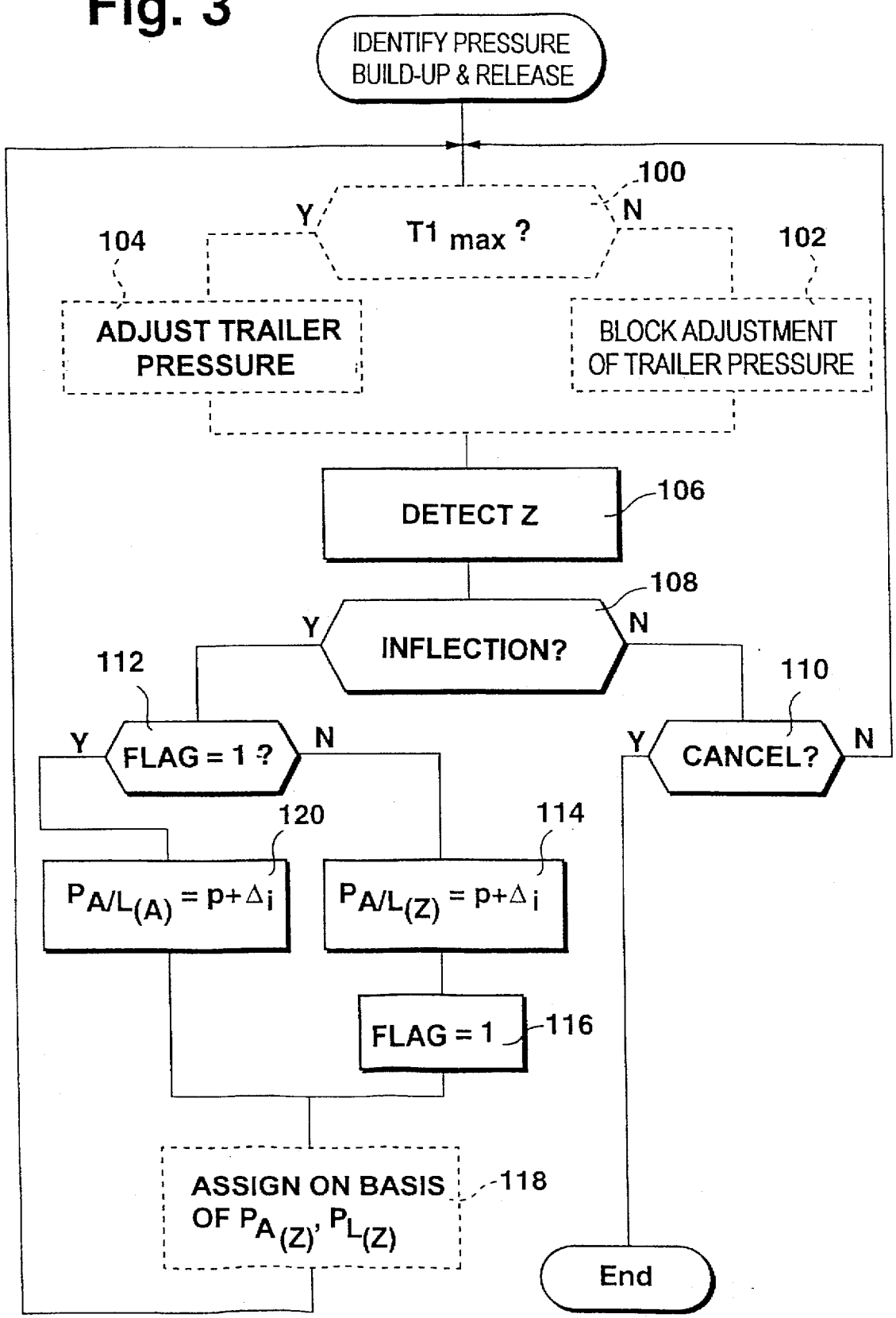
FIG. 3 is a flow chart of the steps for determining the application and release pressures.

The process described above for determining the application and release pressures is explained by the flow chart shown in FIG. 3 on the basis of a preferred exemplary embodiment of an electro-pneumatic brake system. The section of the program sketched in the flow chart is initiated during the pressure buildup or pressure reduction phase when the conditions for the identification of the brake system are present. These conditions can include, for example, a time condition, a condition for the length of time the vehicle has been operated, a condition for the actuation of the brake pedal, etc. Once an identification process has been completed successfully during an operating cycle, no further identifications are performed during this cycle.

As soon as this section of the program has started, it checks in an advantageous exemplary embodiment (broken line) to see in a first step 100 whether a counter running concurrently has reached its predetermined maximum value $T_{1max}$. If this is not the case, then in step 102 the buildup or reduction in the pressure in the trailer is blocked. If the counter has reached its maximum value, then in step 104 the pressure is allowed to build up or decrease in the trailer. As a result of this measure, a delay is achieved in the buildup of the braking pressure or in the release of the brake between the two component vehicles. In the following step 106, the deceleration Z is determined by comparing the velocity of the vehicle with a vehicle velocity value determined during a preceding run of the program. Then, in question step 108, the program checks to see whether there is an inflection in the deceleration curve on the basis of the current deceleration and the deceleration value found during the preceding run of the program. If this is not the case, the program checks to see in step 110 whether the conditions are present for cancelling the identification process. The identification is canceled when, for example, a specified maximum time interval has been exceeded or when the braking process has been ended. Otherwise, the program goes back to step 100. If an inflection in the deceleration curve was found in step 108, then in step 112 a flag is inspected to see if it is has a value of 1. If this is not the case, then in step 114, the braking pressure P prevailing at this moment is stored, possibly under consideration of a tolerance value $\Delta i$, as the application/release pressure $P_A/P_L$; and, in the following step 116, the flag is set to a value of 1. Then, in step 118, in the preferred exemplary embodiment, the value determined in step 114 is assigned to a component vehicle on the basis of the stored values $P_{AZ}$ and $P_{LZ}$ for the tractor, and the program section goes back to step 100. If, when this section of the program runs again, question step 108 finds a new inflection, then, because the flag has a value of 1, in step 120 another pressure value for the application or release pressure is stored on the basis of the prevailing pressure P and possibly the tolerance value $\Delta i$, this new pressure value being assigned in step 118 to the corresponding component vehicle.

The assignment to the tractor occurs when the determined values are sufficiently close to the stored reference values. Otherwise, the determined pressure value is assigned to the second component vehicle.

As a result of the measures illustrated in FIG. 3, therefore, the application/release pressures are stored on the basis of the determination of the inflections of the deceleration curve during both the pressure buildup phase and the pressure reduction phase. Through the advantageous addition of the measures for delaying the braking or delaying the release of the braking at the brakes of the component vehicles and for assigning the stored values on the basis of previously determined values, it is possible to determine the application and release pressures of the brake system of a combination vehicle in a reliable, certain, and accurate manner.

Figure 4:
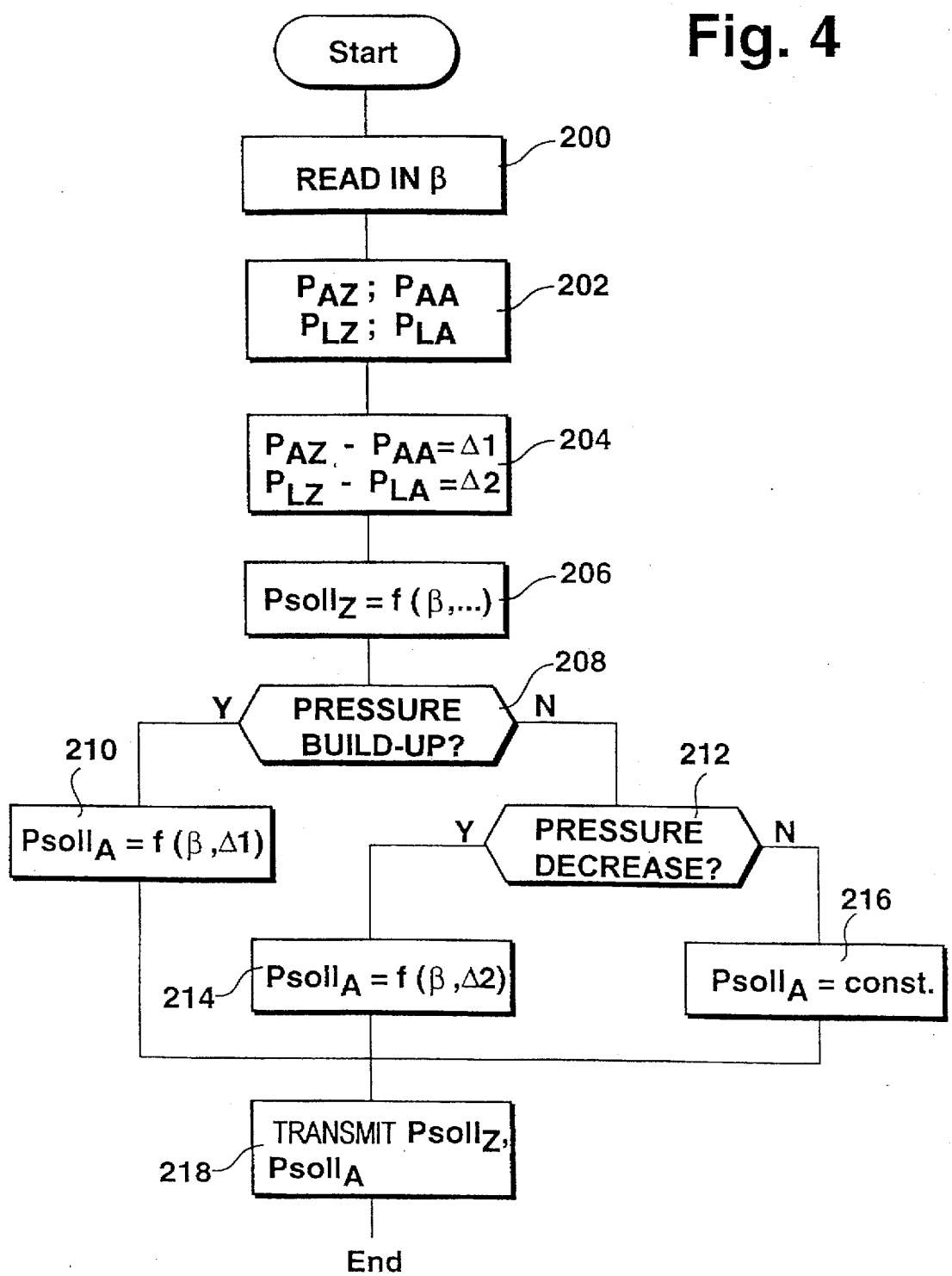
FIG. 4 is a flow chart of the steps using the operation and release pressures during operation of the brake system.

The pressure values which have been determined are then used during the operation of the brake system to compensate for the hysteresis between the application pressures and between the release pressures of the various brake systems. This is shown in FIG. 4. After the program starts, the actuation distance $\beta$ of the brake pedal is accepted as input in the first step 200. Then, in step 202, the application pressures $P_{AZ}$, $P_{AA}$, and the release pressure $P_{LZ}$, $P_{LA}$ Of the individual component vehicles are accepted as input; and the difference between the application pressures of the tractor and the trailer ($\Delta_1$) and the difference between the release pressures of the tractor and the trailer ($\Delta_2$) are determined in step 204. Then, in step 206, the nominal pressure value $P_{sollz}$ for the tractor is determined on the basis of the actuation distance $\beta$ and additional variables such as axle loads, wheel velocities, etc. Next, in step 208, the program checks to see whether pressure is being built up. If the answer is yes, step 210 reads the nominal pressure $P_{sollA}$ to be produced in the trailer from a previously determined characteristic diagram on the basis of the actuation distance $\beta$ and the difference $\Delta_1$.

If the brake system is not in a pressure buildup phase, step 212 of the program checks to see whether pressure is being released. If the answer is yes, step 214 reads the nominal pressure for the trailer from a predetermined characteristic diagram based on the actuation distance β and the difference $\Delta_2$. If pressure is not being released, then in step 216 the nominal pressure for the trailer remains constant at the current value. in final step 218 of this section of the program, the nominal values determined for the tractor and the trailer are sent to their proper destinations.

The nominal values are arrived at in steps 210 and 214 in such a way that the onset of the braking action and its end occur in the trailer at essentially the same time as they do in the tractor. As a result, the hysteresis present between the tractor and the trailer is essentially compensated.

In addition to the determination of the application/release pressures and the hysteresis compensation in combination vehicles described in conjunction with FIGS. 3 and 4, the process according to the invention described above can also be used for the individual wheel brakes of a vehicle. The vehicle can also be equipped with other types of brake systems, in which the operating parameter to be determined will not be the braking pressure but rather the braking moment, the brake tensioning force, etc.

What is claimed is:

1. Process for controlling the brake system of a vehicle having brakes which are subjected to brake tensioning forces by controlling an operating parameter of said brake system, and an electronic control unit which can adjust the brake tensioning forces, said process comprising determining deceleration of the vehicle, determining at least one of brake application and brake release based on deceleration of the vehicle, and determining an operating parameter of said brake system at at least one of said brake application and said brake release, adjusting brake tensioning forces by means of said electronic control unit based on said at least one of the value of said operating parameter at brake application and the value of said operating parameter at brake release.

2. Process for controlling the brake system of a vehicle having brakes which are subjected to brake tensioning forces and an electronic control unit which can adjust brake tensioning forces by controlling an operating parameter of said brake system, said process comprising:

determining values of an operating parameter of said brake system at at least one of brake application and brake release for at least two groups of wheels, wherein each group has at least one wheel;

determining the difference between at least one of said values of said operating parameter at brake application for the two groups of wheels and said values of said operating parameter at brake release for the two groups of wheels; and adjusting brake tensioning forces by means of said electronic control unit based on at least one said differences so that at least one of said brake application and said brake release occurs at substantially the same time at all of said brakes;

said vehicle being a combination vehicle having first and second component vehicles, and each group of wheels being assigned to a separate component vehicle; and wherein the operating values of the operating parameter for at least one of brake application and brake release are determined for a group of wheels for one component vehicle in advance of determining the values of the operating parameter for the other component vehicle, and wherein the values of the operating parameter for the other component vehicle are assigned to the component vehicles based on the values of the operating parameter for the one component vehicle.

3. Process as in claim 1 wherein said vehicle is a combination vehicle having first and second component vehicles, and each component vehicle having a respective group of wheels assigned thereto.

4. Process as in claim 1 further comprising monitoring deceleration of the vehicle, said deceleration being characterized by a curve over time, the brake application and the brake release being determined based on inflections of said time curve.

5. Process as in claim 1 wherein said brake tensioning forces are adjusted after a time delay.

6. Process as in claim 3 wherein the operating values of the operating parameter for at least one brake application and brake release are determined for a group of wheels for one component vehicle in advance of determining the values of the operating parameter for the other component vehicle, and wherein the values of the operating parameter for the other component vehicle are assigned to the component vehicles based on the values of the operating parameter for the one component vehicle.

7. Process for controlling the brake system of a vehicle having brakes which are subjected to brake tensioning forces and an electronic control unit which can adjust brake tensioning forces by controlling an operating parameter of said brake system, said process comprising:

determining values of an operating parameter of said brake system at at least one of brake application and brake release for at least two groups of wheels, wherein each group has at least one wheel;

determining the difference between at least one of said values of said operating parameter at brake application for the two groups of wheels and said values of said operating parameter at brake release for the two groups of wheels; and adjusting brake tensioning forces by means of said electronic control unit based on at least one of said differences so that at least one of said brake application and said brake release occurs at substantially the same time at all of said brakes; and wherein said brakes are one of electro-hydraulic and electro-pneumatic, and wherein said operating parameter representing brake application is application pressure and said operating parameter representing brake release is release pressure.

8. Process for controlling the brake system of a vehicle having brakes which are subjected to brake tensioning forces and an electronic control unit which can adjust brake tensioning forces by controlling an operating parameter of said brake system said process comprising:

determining values of an operating parameter of said brake system at at least one of brake application and brake release for at least two groups of wheels. wherein each group has at least one wheel;

determining the difference between at least one of said values of said operating parameter at brake application for the two groups of wheels and said values of said operating parameter at brake release for the two groups of wheels; and adjusting brake tensioning forces by means of said electronic control unit based on at least one said differences so that at least one of said brake application and said brake release occurs at substantially the same time at all of said brakes;

said vehicle being a combination vehicle having first and second component vehicles, and each group of wheels being assigned to a separate component vehicle; and wherein both the difference between values of the operating parameter at brake application for the separate component vehicles and the difference between values of the operating parameter at brake release for the separate component vehicles are determined, and wherein an actuation distance of the brake pedal is determined, the brake tensioning forces of the second component vehicle being adjusted as a function of the actuation distance and both of said differences.

9. Apparatus for controlling the brake system of a vehicle having brakes which are subjected to brake tensioning forces, said apparatus comprising means for determining the deceleration of the vehicle, means for determining at least one of brake application and brake release based on deceleration of the vehicle, means for determining an operating parameter of said brake system at at least one of said brake application and said brake release, and electronic control means for adjusting brake tensioning forces based on said at least one of the value of said operating parameter at brake application and the value of said operating parameter at brake release.

10. Apparatus for controlling the brake system of a vehicle having brakes which are subjected to brake tensioning forces, said apparatus comprising:

means for determining values of an operating parameter of said brake system at at least one of brake application and brake release for at least two groups of wheels, wherein each group has at least one wheel;

means for determining the difference between at least one of said values of said operating parameter at brake application for the two groups of wheels and said values of said operating parameter at brake release for the two groups of wheels; and electronic control means for adjusting brake tensioning forces based on at least one said differences so that at least one of the brake application and the brake release occurs at substantially the same time at all of said brakes;

said brakes being one of electro-hydraulic and electro-pneumatic, and said operating parameter representing brake application being application pressure and said operating parameter representing brake release being release pressure.

* * * * *